United States Patent
Tisserand et al.

[11] Patent Number: 5,490,899
[45] Date of Patent: Feb. 13, 1996

[54] DEVICE FOR THE PRE-SEALING OF A DOCUMENT TO A PLASTIC BAND

[75] Inventors: Georges Tisserand, La Ferte Gaucher; Jacques Tisserand, Chelles, both of France

[73] Assignee: Idmatics S.A., Colombes, France

[21] Appl. No.: 219,449

[22] Filed: Mar. 29, 1994

[30] Foreign Application Priority Data

Apr. 2, 1993 [FR] France .................. 93 03898

[51] Int. Cl.⁶ .................. B32B 31/10
[52] U.S. Cl. .................. 156/552; 156/519; 271/307; 83/102; 83/107; 493/342
[58] Field of Search .................. 156/552, 519; 271/304, 307; 83/102, 107; 493/342, 345

[56] References Cited

U.S. PATENT DOCUMENTS

| | | | |
|---|---|---|---|
| 2,258,428 | 10/1941 | Stalder | 83/102 X |
| 2,335,033 | 11/1943 | Tompkins | 156/519 |
| 2,390,712 | 12/1945 | Hudgins | 156/302 X |
| 3,505,145 | 4/1970 | Martensson et al. | 156/519 X |
| 3,556,899 | 1/1971 | Strobel . | |
| 3,838,550 | 10/1974 | Mueller | 156/552 X |
| 3,879,246 | 4/1975 | Walker | 156/519 X |
| 4,888,078 | 12/1989 | Instance | 156/302 X |
| 4,952,264 | 8/1990 | Knape | 156/552 X |
| 5,021,111 | 6/1991 | Swenson | 156/519 X |
| 5,197,938 | 3/1993 | Chmielewski | 83/102 X |
| 5,235,515 | 8/1993 | Ungpiyakul et al. | 156/302 X |

FOREIGN PATENT DOCUMENTS

| | | | |
|---|---|---|---|
| 725595 | 1/1966 | Canada | 156/519 |
| 0356221 | 2/1990 | European Pat. Off. . | |
| 0461751 | 12/1991 | European Pat. Off. . | |
| WO91/18816 | 12/1991 | WIPO . | |

Primary Examiner—David A. Simmons
Assistant Examiner—Steven J. Helmer
Attorney, Agent, or Firm—Oblon, Spivak, McClelland, Maier, & Neustadt

[57] ABSTRACT

A device for the pre-sealing of a document to a plastic band comprises at least one first cylinder on which the document is wound from a first given point of space tangential to the cylinder and a mechanism for heating the plastic band at a second point tangential to the cylinder where the plastic band is in contact with the document, this tangential point forming a constant angle ($\alpha$) with the given point of space, the document being pre-sealed by the affixing of the plastic band to this second tangential point. Application to the pre-sealing, to a plastic band, of documents that are to be plastified on an industrial scale.

9 Claims, 7 Drawing Sheets

DEVICE FOR THE PRE-SEALING OF A DOCUMENT TO A PLASTIC BAND

BACKGROUND OF THE INVENTION

The present invention relates to a device for the pre-sealing of a document to a plastic band. It can be applied notably to the plastification of original documents such as identity cards or any other identification documents for example. More generally, it can be applied to the plastification of documents whose condition has to be protected for reasons of security or reliability.

The quality of the plastification of identification documents plays a role notably in the security and reliability that these documents should provide. Various criteria together define this quality. Among these criteria, the evenness of the plastic edges plays a major role. Indeed, it is important that the document, which is a rectangular identification card for example, should be well centered in the middle of a plastic rectangle that covers it, for reasons of automatic recognition or of reliability of the document for example. To this end, when the document is placed, prior to plastification, on a plastic band, it must be perfectly positioned on this band, notably with respect to the cutting-out line of the unit constituted by the document and the plastic band, namely the plastified document. Indeed, most plastification techniques consist in unrolling a first band of plastic on which the document to be plastified is placed. The unit is then covered with a second band of plastic on the face of the document that is opposite to first band. The operations that follow generally consist in heating the bands on the surface of the document in order to affix them definitively and then in cutting out the document thus plastified. A plastic edge is left around the document at the place or else the cutting-out operation is done just at the edge of the document for example. In both cases, the document needs to be properly positioned with respect to the first plastic band in relation to the line along which it is to be cut out, notably to obtain even edges. Now, between the point where the document is placed on the first plastic band and the point where it is cut out or where it reaches the device for heating the bands to affix or seal the document to these bands, there is a certain spacing to make it possible, for example, for the document to be covered with a second plastic band. This gap may also be necessitated, for example, by the amount of space occupied by the machines. During the journey made by a document on a band that is being unrolled, there is thus a risk that this document will get shifted on the band, hence lose its initial position and get wrongly positioned when it passes beneath the cuttings out line. In particular, if there are several rows of documents placed on the plastic band, there is a risk that these documents will get misaligned. The document therefore needs to be affixed to the first band when it is placed on it. This makes it possible, notably, to prevent the document from subsequently shifting on this band. An affixing or sealing can be obtained for example by a heat spot or by a spot of bonder on the band at the position of the document.

If many documents are subsequently plastified in one or more rows, it is important notably that the affixing point or points should be perfectly positioned with respect to the document to prevent the position of the affixing point or points from shifting, as and when documents move past the sealing device, causing a situation where this sealing spot or these sealing spots are located outside the documents and, hence, where these documents are not affixed.

SUMMARY OF THE INVENTION

The aim of the invention is to enable documents to be pre-sealed to a plastic band when they are positioned on this band so that the positions of the pre-sealing spots on the documents remain perfectly stable.

To this end, an object of the invention is a device for the pre-sealing of a document to a plastic band, said device comprising at least:
— a first cylinder on which the document is wound from a first given point of space tangential to the cylinder;
— means to affix the plastic band at a second point tangential to the cylinder where the plastic band is in contact with the document, this tangential point forming a constant angle with the given point of space, the document being pre-sealed by the affixing of the plastic band to this second tangential point.

The main advantages of the invention are that it is suited to devices for the mass plastification of documents and to every type of document as well as being simple to implement and economical.

BRIEF DESCRIPTION OF THE DRAWINGS

Other features and advantages of the invention shall appear from the following description, made with reference to the appended drawings, of which.

DESCRIPTION OF THE INVENTION

Figure 1A:
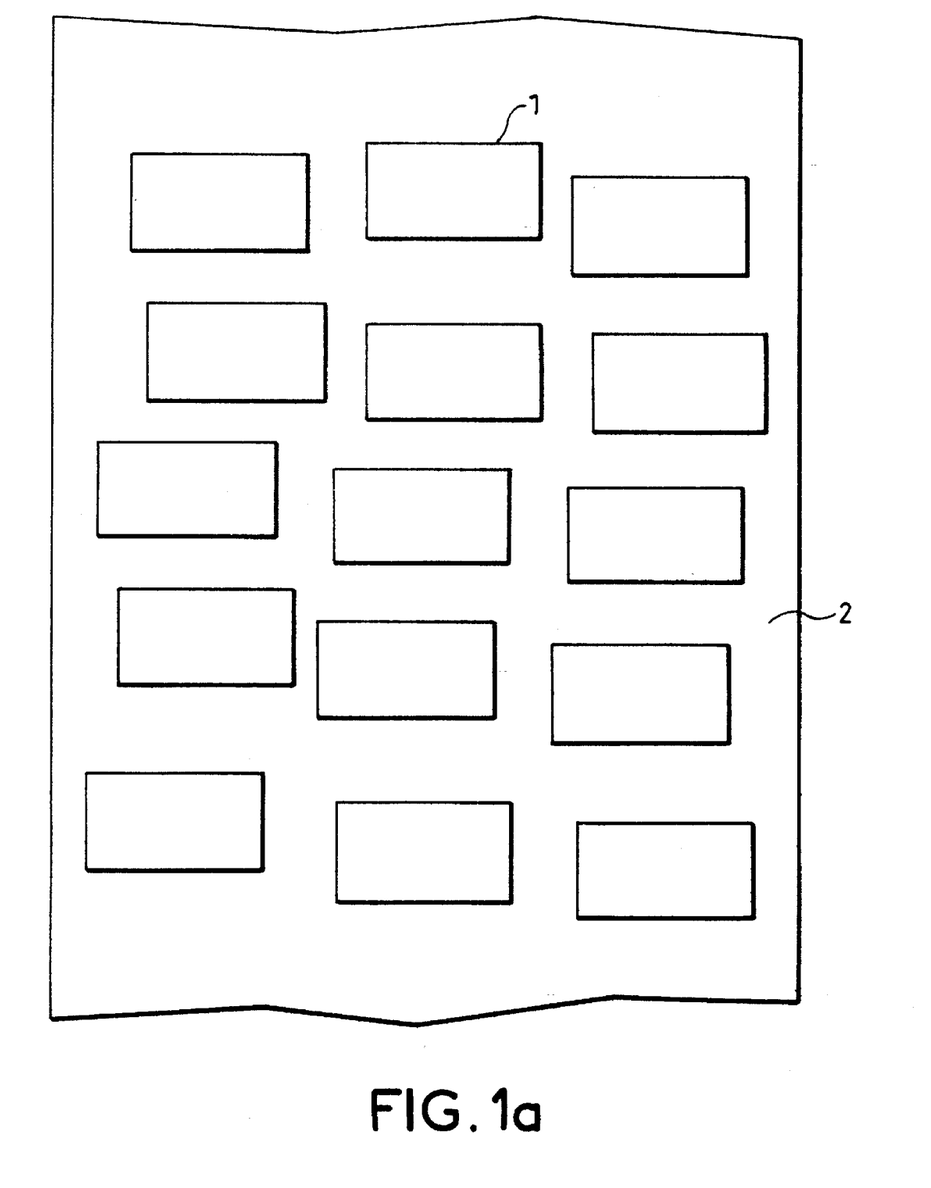
FIGS. 1a and 1b show documents positioned on a plastic band.

FIG. 1a shows documents 1 to be plastified, documents made of paper for example, placed on a plastic band 2. The unit is, for example, covered with a second plastic band and moves past, for example, beneath means for the heating of these bands and beneath means to cut out plastified documents. FIG. 1a shows an exemplary view of three rows of documents 1 that are misaligned because they were not affixed beforehand to the band when they were deposited on it, this misalignment being, for example, due to the motion of the band or to external environmental factors.

Figure 1B:
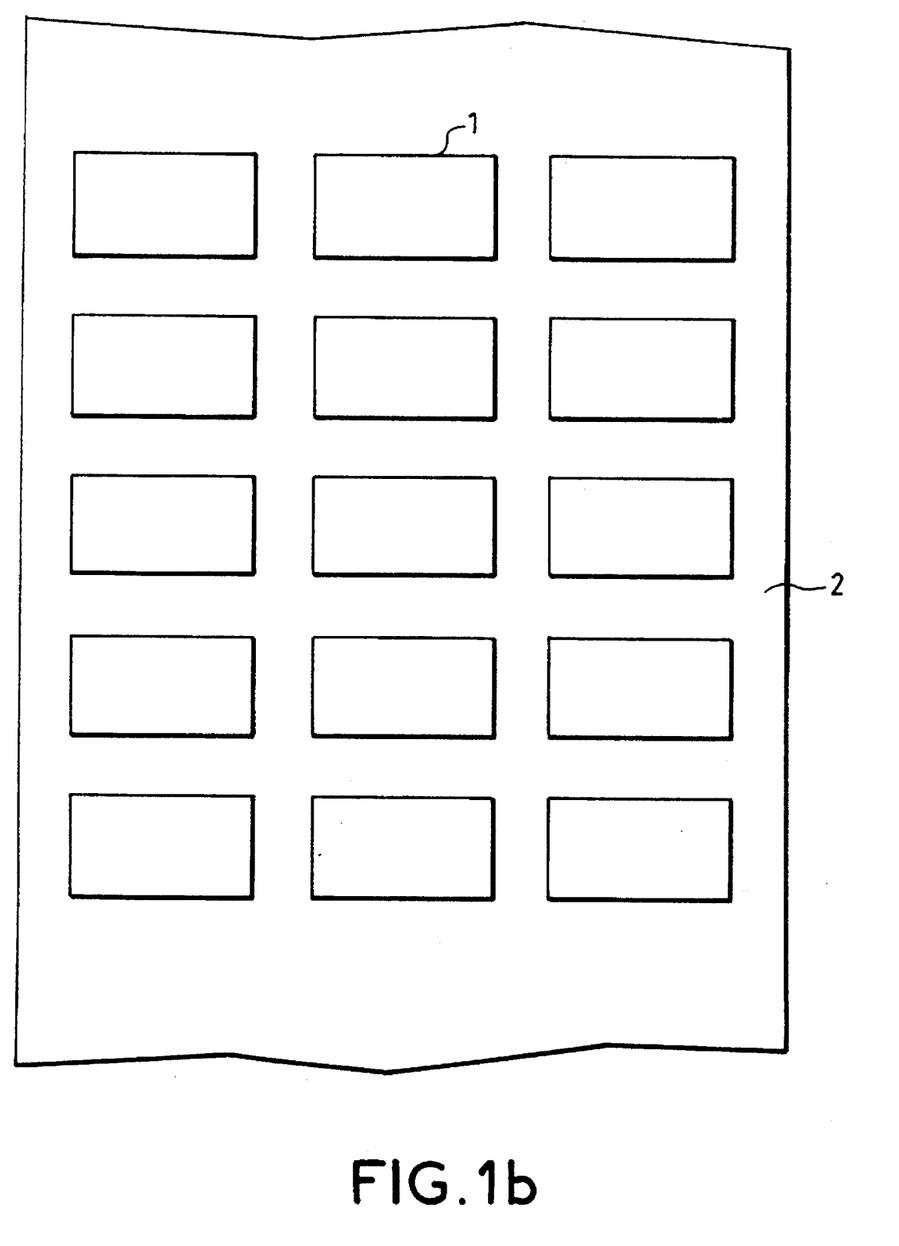

FIG. 1b shows documents 1 that are properly aligned on the plastic band 2. These documents 1 were affixed to the band when they were deposited on it by means of heat spots on the band for example. Indeed, since the adhesion face of the band, which is made of polyethylene for example, is in contact with the document, it gets affixed to the document when it reaches a given temperature while the face of the band opposite to the documents, which is made of polyester for example, is sensitive to heat only at a temperature appreciably higher than this given temperature.

The documents could also be affixed by spots of bonder for example.

Figure 2:
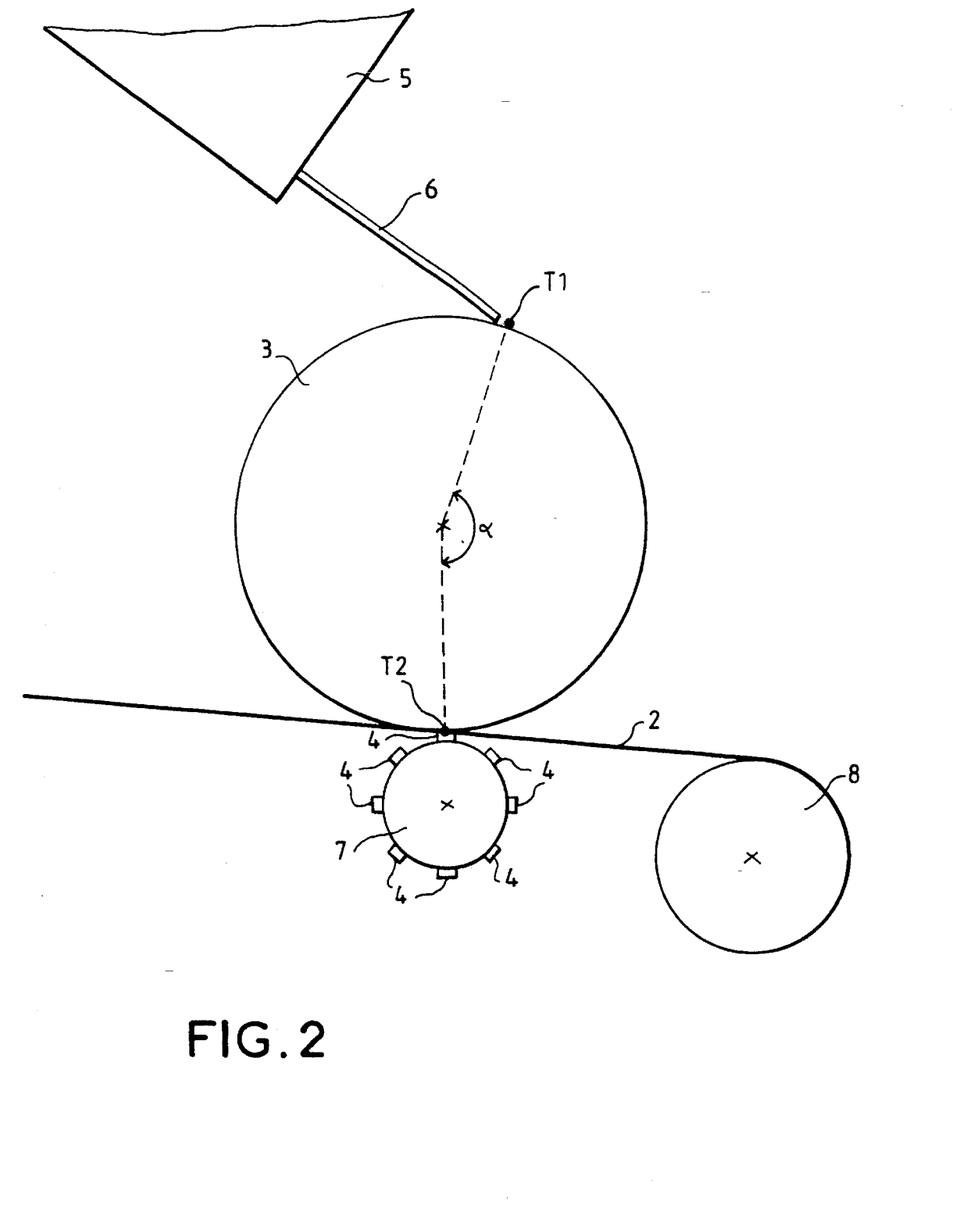
FIGS. 2, 3a, 3b and 4 show possible embodiments of a device according to the invention.

FIG. 2 shows a first possible embodiment of a device according to the invention that makes it possibly notably to affix the above-mentioned documents 1 when they are deposited on the plastic band 2 for example. The device comprises at least one first cylinder 3 on which a document is wound starting from a point T1 of space tangential to this first cylinder and means to affix the plastic band 2 at a point T2 tangential to this first cylinder 3, the two tangential points T1 and T2 forming a constant angle α with each other when taken with reference to the center of the first cylinder 3. The document is stored for example beforehand in a store 5 and then brought to the above-mentioned first tangential point T1 by a guide 6.

The first cylinder 3 has, for example, a continuous and constant rotation speed. The affixing means are, for example, heating means constituted by a metal part 4 heated by an electrical resistor, the temperature of the metal part being, for example, regulated so as to be at a given level. The motions or the activation of the heating means 4 are adjusted so that, when a given point of the document passes by the second tangential point T2, these heating means 4 affix the document to the band 2 at this given point by the heat that it releases on this band 2 at this point. Since the speed of the first cylinder 3 and the instant at which the document starts getting wound on the cylinder are known, the motions or the activation of the heating means can be set so that they affix the document at the desired point. According to one possible embodiment of the invention, the heating means 4, which are heated metal parts for example, are for example affixed to a second cylinder 7 that rotates for example at the same speed as the first cylinder 3 so as to heat the plastic band 2 at the second tangential point T2 when the given point of the document at which the affixing is to be done passes over this second tangential point T2. If several affixing points are required, the second cylinder may, for example, contain several heating means 4 on its periphery. Rotating at the same speed as the first cylinder, it may also support several heating means if several documents are wound about the first cylinder, the number of heating means 4 being equal to the number of documents located between these two points. If a number N of documents is located, for example, on the entire periphery of the first cylinder and if these documents are evenly distributed, then the second cylinder which, for example, has only one heated metal part, can rotate at a speed that is N times greater than that of the first cylinder. In any case, firstly the initial angular position of the second cylinder must be well defined in relation to the second tangential point T2 and, secondly, the relative angular speeds of the two cylinders 3, 7 should be well defined with respect to each other. They are therefore a function of each other.

Indeed, the foregoing speeds having been thus defined, it follows therefrom that the point at which the document is affixed to the band 2 is well defined, the setting of the initial position of the second cylinder then being a function, for example, of the affixing point chosen on the document.

The affixing means, which are constituted for example by heating means 4, could also be constituted notably by bonding means.

When the document reaches the first cylinder 3 at the first tangential point T1, the document is attached, for example, to the first cylinder 3 by a catch. It is held, for example, flat against the surface of the first cylinder 3 by a suction system. To this end, the surface of the cylinder is constituted, for example, by a certain number of holes at which there culminate suction conduits creating a vacuum at the position where they are covered by the document. These very same conduits are used, for example, to place the document on the band 2 by replacing the suction with the blowing of air. This blowing may also be used to cool the first cylinder 3 which is heated by the affixing means or to remove spots from it for example.

The plastic band 2 is, for example, first of all wound around a third cylinder 8 from which it is then unwound.

Figure 3A:
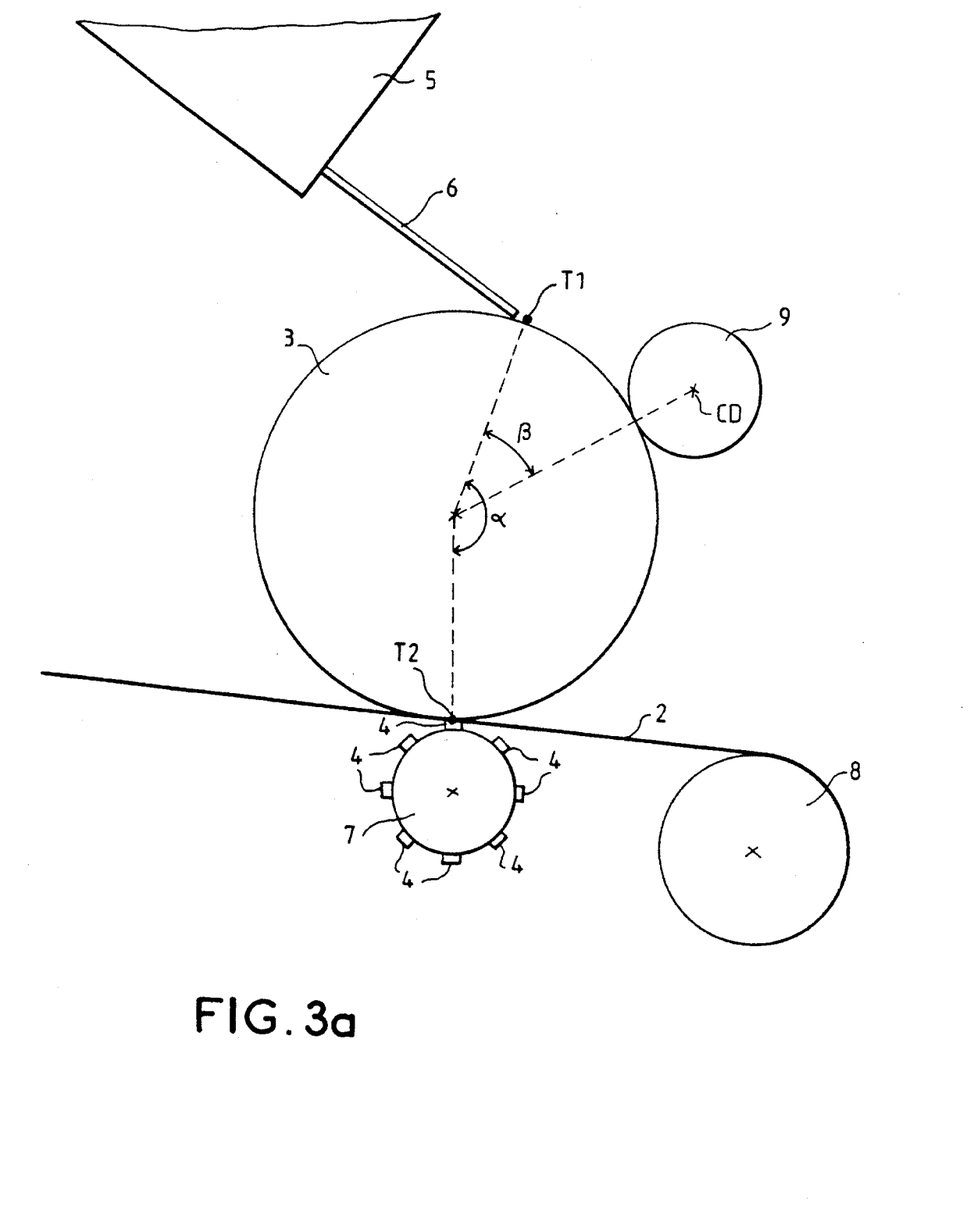

FIG. 3a shows another possible embodiment of a device according to the invention, applied notably to a case where one or more documents are pre-printed on a sheet, the document or documents having to be cut out of the sheet. With the foregoing cylinders 3, 7, there is associated a cutter cylinder 9 shown in a sectional view in FIG. 3b. In this view, it is shown in contact with the first cylinder 3 which is also shown in a sectional view.

The center CD of the cutter cylinder 9 forms, for example, a constant angle β with the first tangential point T1.

Figure 3B:
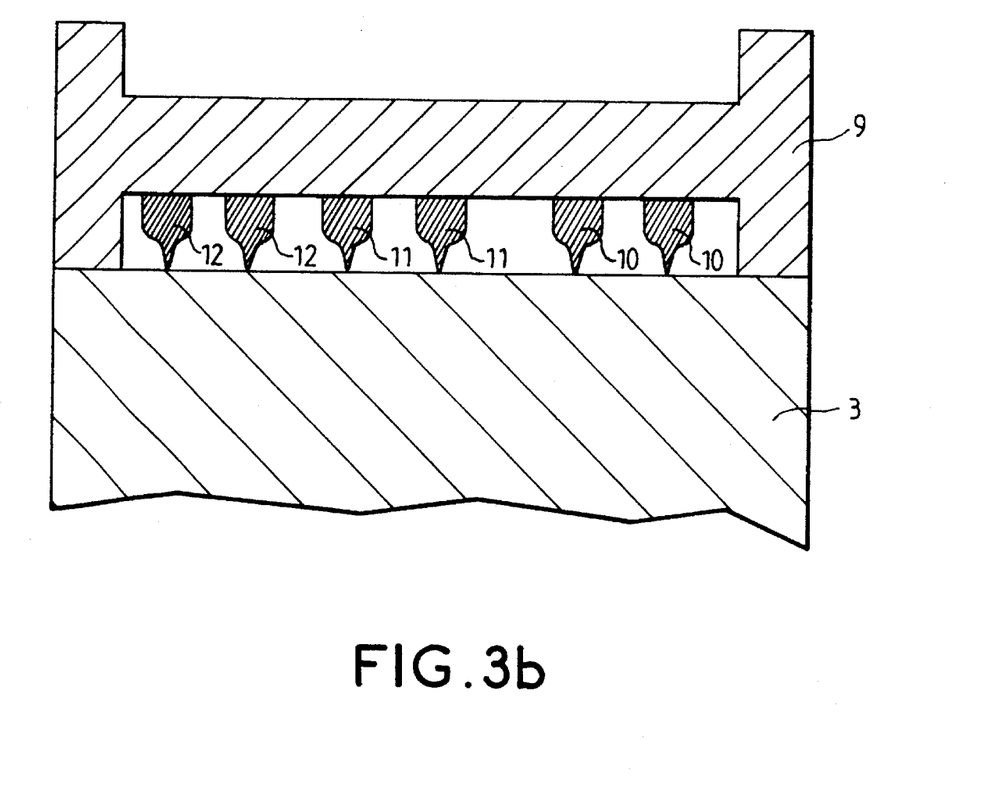

The cutter cylinder 9 has at least one cutter line 10 shown in a sectional view (FIG. 3b). This cutter line 10 is designed to cut printed documents out of a sheet wound about the first cylinder 3 starting from the first tangential point T1, the position of the printed documents being well-defined with respect to first edge of the sheet that encounters this tangential point T1. The document is cut out by the pressure of the cutter cylinder 9 on the first cylinder 3, and more specifically by the pressure of the cutter line 10 on the sheet. The cutter line 10 is constituted, for example, by steel threads with protruding ends. If the sheet contains several rows of documents to be cut out and then plastified, the cutter cylinder 9 then contains, for example, as many cutter lines 10, 11, 12 as there are rows of documents, for example three cutter lines.

The rotational speeds of the first cylinder 3 and of the cutter cylinder 9 are synchronized so that the cutting-out line cuts the documents at the right places, their respective initial positions being furthermore well-defined. The ratio between the speeds is also adjusted so that the documents contained in one and the same sheet and in one and the same row are cut out in the course of one and the same rotation of the cylinder. For example, if the respective formats of the sheets on which the documents are printed and of the first cylinder 3 enable the positioning, on this cylinder, of a number K of sheets for each of its rotations and if each sheet contains a number M of documents in each row, then the cutter cylinder 9 rotates K×M times faster than the first cylinder 3. However, the tangential speeds of the two cylinders are, for example, substantially identical as regards their respective circumferences. To cut the documents at the right places in the sheets, the position of the cutting-out line of the cutter cylinder 9 should be well-defined with respect to the point of time when the sheets start getting wound on the first cylinder 3. To this end, the rotational speeds of the two cylinders 3, 9 may be, for example discontinuous, the first cylinder stopping before it receives a sheet. Then, with this cylinder abutting at the position of the first tangential point T1, the first cylinder rotates again when the angular position of the cutter cylinder reaches a given position, this position being defined so that the documents are cut out at the right places of the sheet, given the respective speeds of the cylinders 3, 9.

Figure 4:
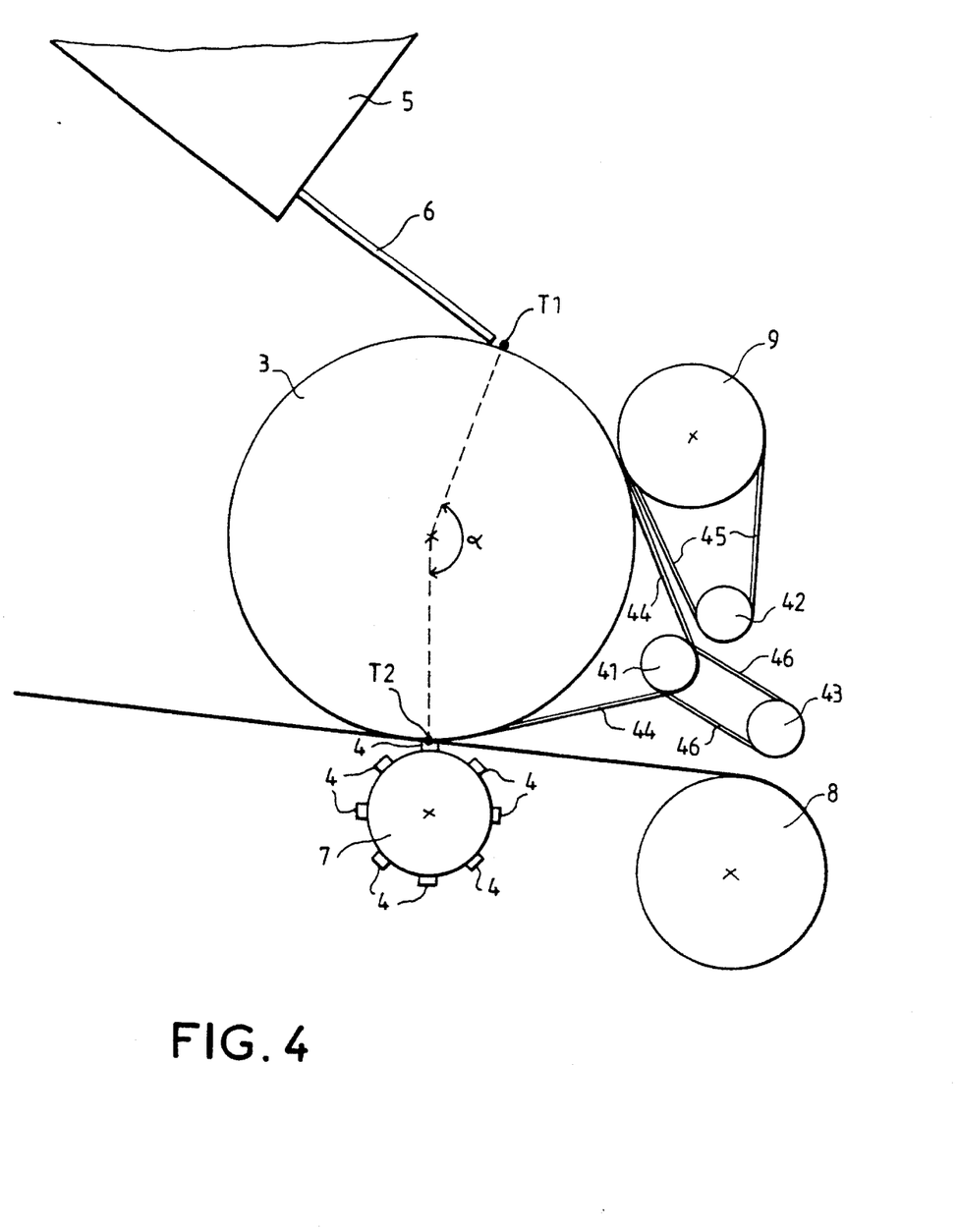

FIG. 4 shows the embodiment of FIG. 3 with, in addition, means to extract the "skeleton" of each sheet from the first cylinder 3, notably to prevent this "skeleton" from hampering the plastification of the documents that have been cut out, this "skeleton" being the remains of each sheet after the cutting-out operation. These extraction means are constituted, for example, by a set of cylinders 41, 42, 43 and series of belts 44, 45, 46. A first extraction cylinder 41 drives a first series of belts 44 housed furthermore in grooves of the first cylinder 3. These grooves are located so that the mutually parallel grooves of the first series 44 are below zones that are not printed on and are therefore destined to form part of the "skeleton" of each sheet. The first extraction cylinder is positioned so that the belts 44 move away from the first cylinder 3 just after the documents have been cut out for example. This enables the "skeleton" of each sheet to be moved away from this first cylinder 3. To prevent the cut-out documents from being carried along by the "skeleton" and, hence, from being separated from the first cylinder 3, notably when the cutting has not been done throughout the periphery of the documents, a second series of belts 45 gets superimposed on the documents after they have been cut out so as to keep these documents on the first cylinder. The belts are driven by the cutter cylinder 9 and by a second extraction cylinder 42, this cylinder 42 being positioned so that the belts 45 of the second series hold the documents properly when they make their exit from the cutting-out operation. If each sheet contains only one row of documents, then this second series contains, for example, only one belt. Optionally, a third series of belts 46 removes, for example, the "skeletons" of the first series of belts, the belts 46 of this third series being driven by the first extraction cylinder 41 and by a third extraction cylinder 43.

Figure 5:
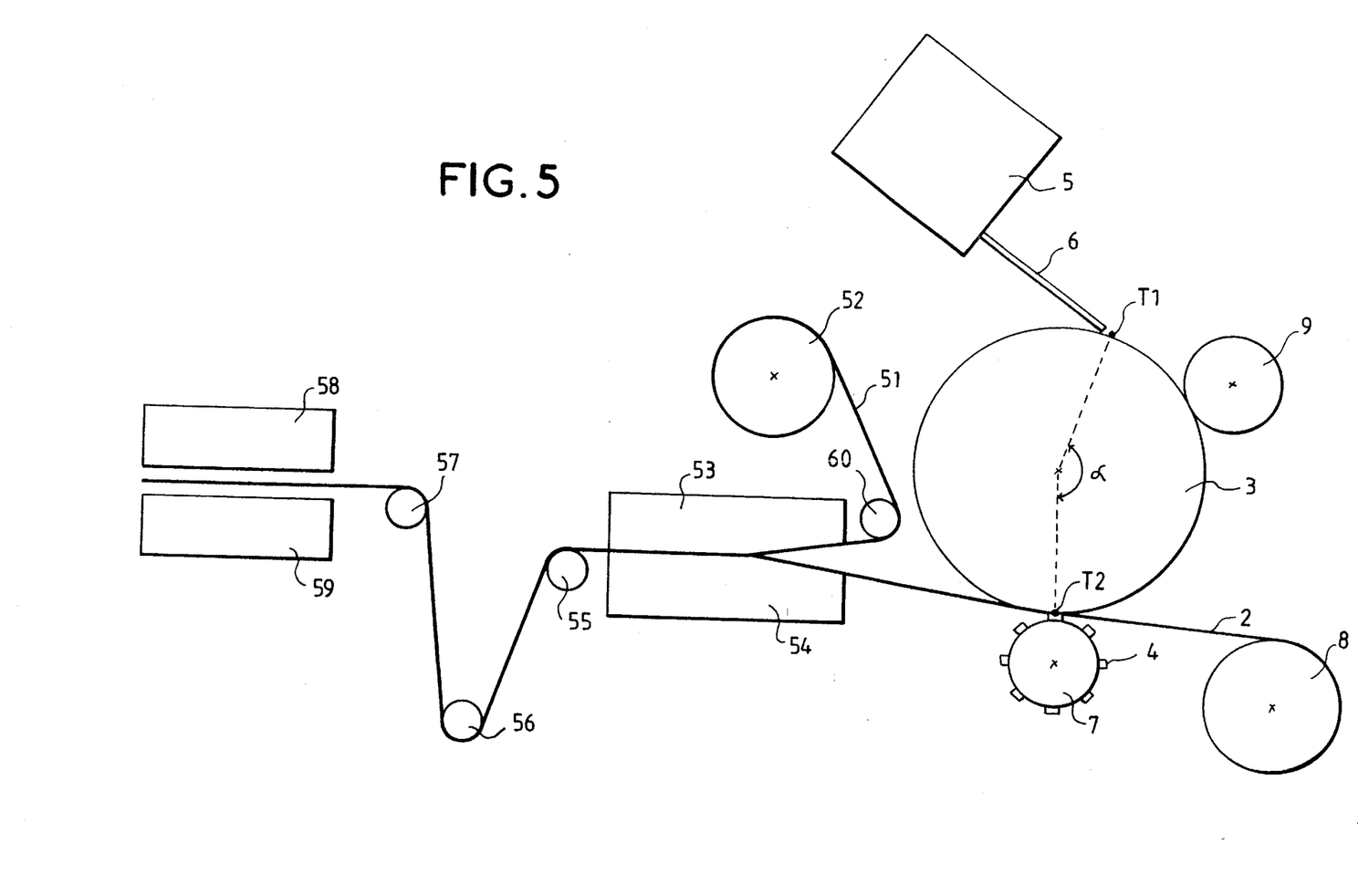
FIG. 5 shows a possible association of a device according to the invention with means for the plastification and cutting out of plastified documents.

FIG. 5 shows a device according to the invention made according to a mode illustrated by the foregoing figures and associated, for example, with a set for the plastification and cutting out of the plastified documents. The "skeleton" extraction means have not been shown.

A second plastic band 51 gets unwound from a cylinder 52 and gets superimposed on the first plastic band 2 and on the documents that are pre-sealed to this first band 2, at the plastification means which are formed, for example, by two heating parts 53, 54. Each of the parts heats one of the bands 2, 51 in order to affix them to the documents. A cylinder 60 interposed for example between the cylinder 52 from which the second band 51 is unrolled and the plastification means 53, 54 deflects this second band 51 so that it can enter the plastification means tangentially to the first band 2. When they come out of the plastification means 53, 54, the two plastic bands and the documents are deflected by a set of three cylinders 55, 56, 57 towards cutting-out means 58, 59. These means 58, 59 cut the plastified documents out. They are constituted, for example, by a punch 58 that gets engaged in a punch-out die 59. They comprise several punches if several plastified documents have been cut out simultaneously. By adjusting the position of one of the above-mentioned three cylinders 55, 56, 57, it is possible to adjust the position of the documents with respect to the cutter line of the cutter means 58, 59.

The pre-sealing of the documents to the first plastic band 2 enables these documents to keep a fixed position on this band until they enter they plastification means 53, 54.

Should there be a change in the format of the documents or of the sheets on which they are printed, no change need be made in the device according to the invention except to replace the first cylinder 3 by another cylinder of a suitable size and to adjust the position of the other parts of the device in relation to this new cylinder.

A cutting-out system similar to the one comprising the first cylinder 3 and the cutter cylinder 9 could, for example, replace the system 58, 59 for cutting out the above-described plastified cards.

What is claimed is:

1. A device for the pre-sealing of a document to a plastic band, said device comprising:

a first cylinder on which the document is wound from a first point of space tangential to the first cylinder; and means to affix the document to the plastic band at a second point tangential to the first cylinder where the plastic band is in contact with the document, a constant angle $\alpha$ being formed between a first line extending from a center of the first cylinder to the first tangential point and a second line extending from the center of the first cylinder to the second tangential point, the document being pre-sealed by the affixing of the plastic band to the second tangential point;

wherein, with the document being printed on a sheet, the sheet being wound on the first cylinder from the first tangential point, a cutter cylinder cuts the document out by pressure on the first cylinder, the cutter cylinder comprising a cutter line that is then pressed to the sheet;

the device further comprising:

extraction means to extract remains of the sheet, the extraction means being formed by a set of extraction cylinders and a plurality of sets of belts, at least one first set of belts being housed in the first cylinder and being driven by a first extraction cylinder to move the remains of the sheet away from the first cylinder, a second set of belts being driven by the cutter cylinder and a second extraction cylinder keeping the cut-out document on the first cylinder.

2. A device according to claim 1, wherein the extraction means further comprise a third extraction cylinder and a third set of belts to move the remains of the sheet away from the first set of belts, the third set of belts being driven by the second and third extraction cylinders.

3. A device for the pre-sealing of a document to a plastic band, the device comprising:

a rotatable first cylinder on which the document is wound;

means for supplying and guiding the document onto the first cylinder at a first predetermined point of space tangential to the first cylinder, said first cylinder having a continuous and constant rotational speed when the document is supplied to said first tangential point;

a rotatable second cylinder positioned adjacent to said first cylinder at a predetermined second point on the first cylinder which is tangential to the first cylinder, wherein a constant angle $\alpha$ is defined between a first line extending from a center of said first cylinder to said first tangential point and a second line extending from the center of the first cylinder to the second tangential point; and means for supplying the plastic band between the first and second rotating cylinders;

wherein:

said second cylinder comprises means for heating the plastic band at the second tangential point as the plastic band passes between the first and second cylinders so as to affix the document on the first cylinder to the plastic band at the second tangential point, such that the document is pre-sealed at a position of the document at the second point to provide for a stable positioning of the document on the plastic band, wherein, with the document being printed on a sheet, the sheet being wound on the first cylinder from the first tangential point, a cutter cylinder cuts the document out by pressure on the first cylinder, the cutter cylinder comprising a cutter line that is pressed to the sheet;

the device further comprising:

extraction means to extract remains of the sheet, the extraction means being formed by a set of extraction cylinders and a plurality of sets of belts, at least one first set of belts being housed in the first cylinder and being driven by first extraction cylinder to move the remains of the sheet away from the first cylinder, a second set of belts being driven by the cutter cylinder and a second extraction cylinder keeping the cut-out document on the first cylinder.

4. A device according to claim 3, wherein a constant angle $\beta$ is formed between the first line extending from the center of the first cylinder to the first tangential point and a third line extending from the center of the first cylinder to a center of the cutter cylinder.

5. A device according to claim 3, wherein a rotational speed of the cutter cylinder is substantially a multiple of the rotational speed of the first cylinder.

6. A device according to claim 3, wherein the extraction means further comprise a third extraction cylinder and a third set of belts to move the remains of the sheet away form the first set of belts, the third set of belts being driven by the second and third extraction cylinders.

7. A device according to claim 3, associated with plastification means and means for the cutting out of plastified documents, the plastification means heating the band to which the documents are pre-sealed.

8. A device according to claim 3, wherein the heating means comprises at least one heating metal part fixed to the second cylinder, an angular position of the second cylinder being defined beforehand and rotational speeds of the first and second cylinders being a function of each other.

9. A device according to claim 8 wherein, with the first and the second cylinders rotating at the same rotational speed, the second cylinder has as many heating metal parts as there are documents to be pre-sealed per rotation and per row of the second cylinder.

* * * * *